United States Patent [19]

Kravetz

[11] 4,411,240

[45] Oct. 25, 1983

[54] METHOD AND APPARATUS FOR THE PREVENTION OF LOW TEMPERATURE DIESEL ENGINE FAILURE

[76] Inventor: John J. Kravetz, 87 Ox Bow Rd., Fairfield, Conn. 06430

[21] Appl. No.: 374,965

[22] Filed: May 5, 1982

[51] Int. Cl.³ .................... F02N 17/02; F02M 31/00
[52] U.S. Cl. ........................... 123/557; 123/142.5 E; 123/142.5 R; 123/549
[58] Field of Search ........ 123/557, 549, 516, 142.5 R, 123/142.5 E, 456, 514

[56] References Cited

U.S. PATENT DOCUMENTS

| | | | |
|---|---|---|---|
| 2,599,699 | 6/1952 | Dilworth | 123/514 |
| 3,724,436 | 4/1973 | Nagata | 123/506 |
| 3,768,454 | 10/1973 | Markland | 123/557 |
| 3,961,612 | 6/1976 | Okamoto | 123/497 |
| 4,041,697 | 8/1977 | Coffinberry | 123/557 |
| 4,175,527 | 11/1979 | Sanada | 123/516 |
| 4,180,036 | 12/1979 | Wolf | 123/557 |
| 4,187,813 | 2/1980 | Stumpp | 123/557 |
| 4,228,776 | 10/1980 | Gallione | 123/557 |
| 4,245,593 | 1/1981 | Stein | 123/142.5 E |
| 4,286,551 | 9/1981 | Blitz | 123/142.5 E |

FOREIGN PATENT DOCUMENTS

| | | | |
|---|---|---|---|
| 1153211 | 8/1963 | Fed. Rep. of Germany | 123/557 |
| 310604 | 10/1955 | Switzerland | 123/557 |
| 1216653 | 12/1970 | United Kingdom | 123/516 |

Primary Examiner—Ronald B. Cox
Attorney, Agent, or Firm—Israel Nissenbaum

[57] ABSTRACT

A method and apparatus for the prevention of diesel engine failure at low temperatures comprising circulating the diesel fuel for said engine, preferably in a heated state, when the engine is not in operation. The fuel is circulated through a diverted closed fuel line loop which is auxiliary to and separated from the engine circulatory fuel line. The auxiliary fuel line loop embodies a diverting means from the engine fuel line, circulating means such as a low power fuel pump and preferably an integral heating means. The auxiliary fuel line loop is diverted adjacent the primary steel fuel filter and includes the fuel storage tank therein.

16 Claims, 1 Drawing Figure

U.S. Patent      Oct. 25, 1983      4,411,240
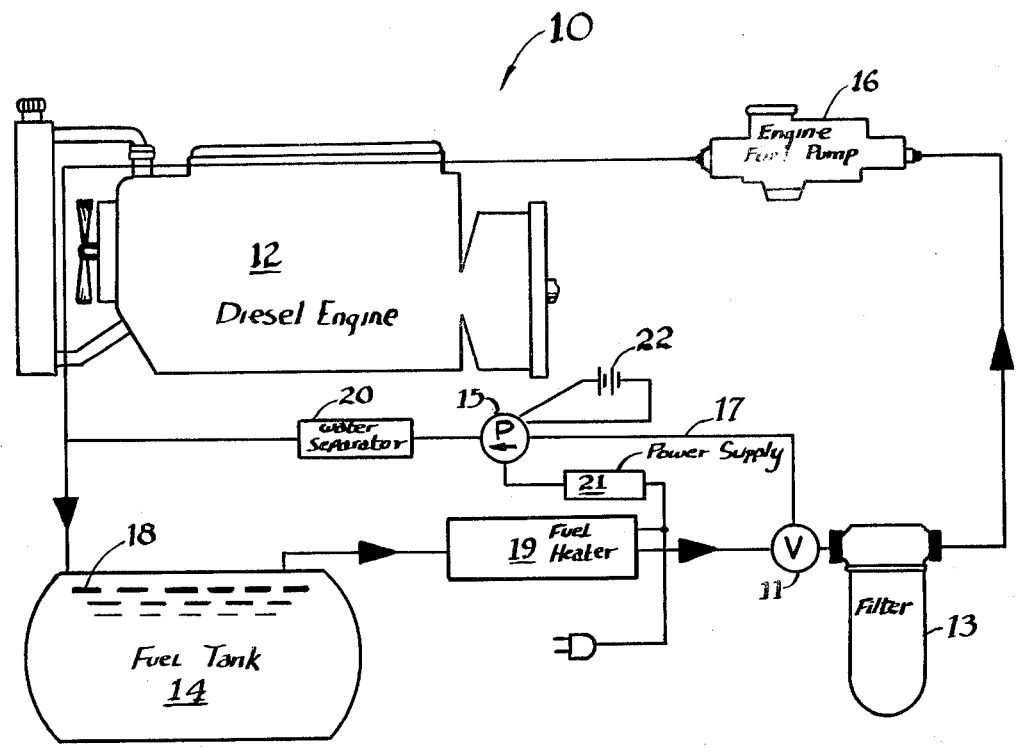

METHOD AND APPARATUS FOR THE PREVENTION OF LOW TEMPERATURE DIESEL ENGINE FAILURE

This invention relates to diesel fuel engines and particularly such engines operated at low temperatures.

Diesel engines have, because of recent fuel shortages, become increasingly popular as a result of their inherent fuel economy. In fact, the entire trucking industry is dependent upon the use and maintenance of diesel engines. However, with the recent increased utilization and popularity of diesel engine vehicles, proper formulation of diesel fuels has become increasingly neglected. As an example, the practice of mixing small percentages of kerosene and other additives with the diesel fuel to prevent cold weather gelling has been severely curtailed. Thus, at present, a major problem with diesel engines is maintaining their operability in the face of cold weather gelling ($-10°$ F. or lower) wherein the fuel totally loses its fluidity. A second problem though not as severe in nature as gelling but which occurs more frequently with more insidious debilitating effect is the gradual formation of wax solids (waxing) in the diesel fuel at temperatures below 20° F. (cloud point). Fuel which has waxed retains fluidity and may be successfully utilized in operation without special consideration except that the engine must be gradually warmed up. The vehicle may therefore be started without any initial indication or warning of the wax build up. However, without any further warning sudden acceleration, such as with the vehicle attempting to enter a highway, may result in the sudden and substantially complete failure of the diesel engine for lack of fuel at the most inopportune and dangerous moments.

In the past, attempts to alleviate the gelling and waxing problems inherent with diesel fuels have been legion. Vehicles having diesel engines have generally also been equipped with block heaters to warm the fuel at least above its gelling point, whereby fluidity may be achieved for initial engine operation. In severely cold climates, engines are kept constantly running to prevent the instant gelling which would occur. However, a great amount of fuel is expended thereby simply to keep the fuel flowing and warm. For cost savings independent heaters have been integrated into engine fuel systems. Such heaters directly heat the fuel such as with a heater coil immersed in the fuel storage tank or as an integral part of the fuel line. Alternatively, a secondary heat source such as heated water is circulated through coils immersed in the fuel storage tank.

Though the aforementioned expedients have been generally adequate in providing sufficient heat to prevent gelling of the diesel fuel, the waxing condition has been difficult to alleviate even when the engine is kept constantly idling particularly at very cold ambient climates wherein fuel even only partially removed from proximity with the heat source tends to rapidly wax. Furthermore, the aforementioned expedients are relatively ineffective once the fuel filter has become clogged since the heat flow through the fuel is insufficient to efficiently melt wax crystals already trapped in the filter.

It is an object of the present invention to provide a method and an apparatus to prevent low temperature waxing and sudden low temperature diesel engine failure even when the engine is not in operation.

This and other objects, features and advantages of the present invention will become more evident from the following discussion as well as the drawing in which:

The sole FIGURE schematically depicts a diesel engine fuel circulatory system having the low temperature waxing prevention means of the present invention as an integral part thereof.

Generally the present invention comprises an integral means for alleviating waxing of diesel fuels at low temperatures when the diesel engine is not in operation. In accordance with the present invention the diesel fuel itself is circulated, or more preferably heated and circulated during periods when the engine is not operating. The flow rate of the diesel fuel is at least one gallon per minute for the non-heated fuel and at least one half gallon per minute for the heated fuel. Circulation of diesel fuel through the diesel engine fuel circulatory system during periods when the engine is not operating is however an impractical expedient since an inordinate amount of effort and energy would be required to overcome the static nature of the engine fuel pump when the engine is not operating. Since such fuel circulation was impractical only direct heating of the diesel fuel such as with a block heater or fuel line heater or circulation of a secondary heating fluid such as water to warm the fuel has been utilized. In fact continued engine idling with constant fuel circulation through the engine fuel circulatory system does not effectively reduce waxing to prevent engine shutdown during rapid acceleration since such circulation is very slow and the fuel line itself, exposed to ambient temperatures, is of considerable length. Such expedient generally only prevents gelling conditions.

The diesel fuel is circulated, in accordance with the present invention through an auxiliary closed fuel line loop integrated into the normal engine fuel line circulatory system. The closed fuel line loop includes circulation means such as a low power auxiliary fuel pump whereby only minimal amounts of energy are required for the requisite circulation. Preferably the auxiliary fuel line loop also includes the fuel storage tank as a part thereof for maximum efficacy and it is preferred that the loop not include the primary diesel fuel filter such that maximum flow rate may be achieved even in the initial presence of some waxing.

The low power fuel pump is preferably electrically powered by an independent electrical power line for overnight or long period circulation. For shorter periods the pump may be powered by a battery such as a vehicle battery or more preferably by an auxiliary battery which is integrated with the charging system of the vehicle.

The auxiliary fuel line loop of the present invention is provided with diverting means such as a cutoff valve whereby the loop may be isolated from the engine fuel circulatory system and whereby the resistance of the engine fuel pump is obviated thereby. The cutoff valve may be either manually operable as desired or automatic with the engine startup and shutdown. The auxiliary fuel line loop provides the additional advantage of a surface area of exposed fuel line substantially less than that of the enginge circulatory system whereby continued waxing from ambient cold may be more effectively dealt with.

During engine operation, the diverting means such as the cutoff valve is returned to a position whereby the auxiliary fuel line loop is opened into the engine fuel line. It is preferred that the diverting means such as the cutoff valve be positioned as close as practicable to the primary filter such that a minimum of non-circulated fuel passes through the fuel filter. If necessary, the portion of fuel line between the diverting means and the filter should either be insulated whereby the minimal amount of fuel therein retains the heat from the heated circulating, or such portion should be independently heated. In order to insure that the prevention of waxing is fully effective it is preferred that the fuel be heated by an electric heater, with a minimum rating of 300 watts, during its circulation, from about 70° F. to about 180° F. and that the rate of fuel flow within the closed loop should be at least 1.5 gallons per minute past a given point. With such heating the present invention provides a secondary important advantage. In conjunction with the circulation, the heating of the diesel fuel increases fuel economy by continually expanding the fuel for efficient combustion upon initial engine operation. Such efficiency is manifested by increases in fuel economy of up to 12% in miles per gallon.

In a further preferred embodiment, whereby fuel efficiency may be additionally enhanced, the closed fuel line loop may further embody a water separator. Thus while the diesel fuel is being circulated to remove or prevent waxing, water (the most detrimental base of diesel engines) may be simultaneously removed from the diesel fuel. The diesel fuel is thereby purified and refined for greater effectiveness and longer engine life.

With reference to the drawing, the FIGURE schematically depicts a typical diesel engine circulatory fuel line system 10 utilized in conjunction with diesel engine 12. The circulatory fuel line system 10 comprises a fuel storage tank 14, an engine fuel pump 16, generally integrated with the engine cam shaft such that the fuel pump 16 is rendered inoperable when the engine is not in operation, and a primary diesel fuel filter 13. The fuel 18 circulates through the fuel line system 10 through the primary filter 13 which has openings therein in the micron size range to efficiently clean the diesel fuel since diesel engines are particularly susceptible to damage by dirty fuel. However, by the same token, the primary filter is very susceptible to being rapidly clogged by wax formation. Thus in accordance with the present invention an auxiliary fuel line loop 17 is tapped into circulatory fuel line system 10. In diesel engines the circulatory fuel line system is a closed system with about ⅔ of the fuel being returned unused during engine operation. Auxiliary fuel line loop 17 is a secondary closed system but with a substantially smaller exposed surface area thereby being less susceptible to waxing from ambient cold conditions.

Diverter valve 11, located adjacent the primary fuel filter, is turned (manually or automatically) to divert fuel flow through auxiliary closed fuel line loop 17, rather than through filter 13 and fuel pump 16, during periods of non-operation of engine 12. The auxiliary fuel line loop 17 includes fuel tank 14, fuel heater 19 and auxiliary fuel pump 15. The fuel heater 19 and fuel pump 15 are preferably connected to an outside electrical power supply 21. However, fuel pump 15, because of its low power requirements may also be powered by an auxiliary battery 22 for short periods of engine non-operation.

Continual circulation of diesel fuel 18 through the closed loop 17 prevents wax build up particularly with the use of fuel heater 19. Optional water separator 20 operates to remove water from the diesel fuel during such circulation. When engine operation is desired, diverter valve 11 is returned to its normal position for facilitated circulation of the dewaxed fuel 18 through filter 13 without sudden engine failure even at extremely low temperatures and additionally with increased fuel efficiency.

It is understood that the embodiment depicted in the drawing is illustrative in nature and that changes in structure and procedure are possible without departing from the scope and spirit of the present invention as defined in the following claims. Additionally, while the present invention has particular applicability to diesel engines utilized in vehicles, it has similar applicability to any diesel engine used in cold ambient climates.

What is claimed is:

1. A method for preventing waxing and sudden failure in a diesel engine which comprises part of a diesel fuel circulatory system, with said circulatory system further including a fuel storage tank, said method comprising the steps of diverting diesel fuel flow from said engine and associated fuel pump only during non-operation of the engine and thereafter circulating said diesel fuel during said non-operation in an auxiliary closed fuel line loop integral with said diesel fuel circulatory system but which loop does not include said engine and associated fuel pump with said fuel storage tank being included within said auxiliary fuel line loop.

2. The method of claim 1 wherein said fuel is circulated at a rate of at least one gallon per minute.

3. The method of claim 1 wherein said fuel is heated while being circulated.

4. The method of claim 3 wherein said fuel is circulated at a rate of at least one half gallon per minute.

5. The method of claim 1 wherein said fuel has water separated therefrom during said circulation.

6. A method for preventing waxing and sudden failure in a diesel engine which comprises part of a diesel fuel circulatory system, said method comprising the steps of diverting fuel flow from said engine and associated fuel pump during non-operation of the engine and thereafter circulating said fuel in an auxiliary closed fuel line loop integral with said diesel fuel circulatory system but which loop does not include said engine and associated fuel pump, wherein said fuel circulatory system includes a fuel storage tank and a primary fuel filter positioned between said tank and said engine and wherein said closed fuel line loop includes said fuel storage tank and said fuel is diverted at a point of said fuel circulatory system prior to and adjacent said primary fuel filter.

7. The method of claim 1 wherein said fuel is circulated by an auxiliary fuel pump unassociated with said engine.

8. A diesel fuel circulatory system, for a diesel engine, comprising a fuel storage tank, a primary fuel filter, a diesel engine with associated fuel pump and a fuel line connecting said tank, filter and engine characterized in that said diesel fuel circulatory system further comprises an auxiliary closed fuel line loop integrated with said fuel line and not including said filter and engine, means for diverting diesel fuel from passing through said primary fuel filter and engine with associated fuel pump and into said auxiliary closed fuel line loop during non-operation of said engine, and means for circulating said fuel through said auxiliary closed fuel line loop during non-operation of said engine.

9. The diesel fuel circulatory system of claim 8 wherein said circulatory means comprises an auxiliary fuel pump unassociated with said engine.

10. The diesel fuel circulatory system of claim 8 wherein said auxiliary closed fuel line loop includes heating means for heating said fuel during circulation thereof through said auxiliary closed fuel line loop.

11. The diesel fuel circulatory system of claim 8 wherein said auxiliary closed fuel line loop includes said fuel storage tank therein.

12. The diesel fuel circulatory system of claim 8 wherein said diverting means comprises a cutoff valve positioned prior to and adjacent said primary fuel filter.

13. The diesel fuel circulatory system of claim 12 wherein the segment of said fuel circulatory system between said point of diversion and said primary fuel filter is insulated.

14. The diesel fuel circulatory system of claim 12 wherein the fuel in the segment of said fuel circulatory system between said point of diversion and said primary fuel filter is heated by heating means.

15. The diesel fuel circulatory system of claim 9 wherein said auxiliary fuel pump is battery powered.

16. The diesel fuel circulatory system of claim 8 wherein said auxiliary closed fuel line loop includes means for separating water from said diesel fuel during circulation of said fuel through said auxiliary closed fuel line loop.

* * * * *